United States Patent
Chen

(10) Patent No.: US 8,012,404 B2
(45) Date of Patent: Sep. 6, 2011

(54) COMPOSITION WITH WOODEN QUALITY, AND A METHOD OF ITS PREPARATION

(76) Inventor: Xinggeng Chen, Sanmen (CN)

( * ) Notice: Subject to any disclaimer, the term of this patent is extended or adjusted under 35 U.S.C. 154(b) by 991 days.

(21) Appl. No.: 11/901,648

(22) Filed: Sep. 18, 2007

(65) Prior Publication Data
US 2008/0193703 A1 Aug. 14, 2008

(30) Foreign Application Priority Data
Feb. 14, 2007 (CN) .......................... 2007 1 0067254

(51) Int. Cl.
*B28B 1/00* (2006.01)
(52) U.S. Cl. ........................................ 264/683
(58) Field of Classification Search ........................ None
See application file for complete search history.

(56) References Cited

U.S. PATENT DOCUMENTS

| | | | | |
|---|---|---|---|---|
| 4,977,033 | A | * 12/1990 | Akao | 428/516 |
| 7,249,745 | B2 | * 7/2007 | Moore et al. | 248/345.1 |
| 2006/0173105 | A1 | * 8/2006 | Griffin et al. | 524/35 |

FOREIGN PATENT DOCUMENTS

| | | |
|---|---|---|
| CN | 95117967.5 | 8/1996 |
| CN | 02129412.7 | 2/2003 |

* cited by examiner

*Primary Examiner* — Angela Ortiz
*Assistant Examiner* — Camie S Thompson
(74) *Attorney, Agent, or Firm* — Hamre, Schumann, Mueller & Larson, P.C.

(57) ABSTRACT

A new type of composite with wooden quality, which contains a plastic inner layer and an outer envelope is described. The plastic inner layer is crosslinked with the outer envelope, the latter of which is made up from a plastic material containing a 5-20 wt. % of wood flour.

5 Claims, 1 Drawing Sheet

COMPOSITION WITH WOODEN QUALITY, AND A METHOD OF ITS PREPARATION

FIELD

The following disclosure relates to a kind of composition with wooden quality as well as its preparation, and particularly relates to the technical realm of materials relating to construction and outdoors decoration.

TECHNICAL BACKGROUND

Construction and outdoors decoration at present largely depend upon wooden products, causing the dramatic increase of destruction of forests, and deterioration of environment. Therefore, it is of great importance to find and exploit new techniques and new products that protect the environment and economize resources. As some examples, resin materials have been used to replace a wooden material. While such resin materials may have desirable qualities such as anti-impact, anti-aging, anti-erosion, anti-water, anti-humidity and fire-resistance, they lack the outer appearance and original smell of true wood, and are unable to satisfy the aesthetic needs of people in the modern society.

Chinese Patent Application (95117967.5) involves a kind of composite (board/profile) and its fabrication methods, which mainly includes the breaking up and rubbing of wood material waste and scraps to obtain wooden flour with smaller particles, which are blended with a coupling agent, tackifier, stabilizer and thermal plasticity pastern, and then put into a high-speed blender to undergo even and enough blending with steam being evaporated to become the core material, which is to be fed into a combined extrusion line. The core material is made through co-extrusion by a principal extruder. Thermal plastic flour (particle) with plasticity and good compatibility is chosen according to specification requirements of the products, and is fed into a vice extruder in the production line of combined extrusion, to produce the outer layer that envelopes part of or the whole of the core material, for example to fabricate board or profile products. Though this method avoids the large consumption of timber that is needed by traditional technology of fabrication of profile and board, the plastic material adopted in the outer envelope, such as PVC, PP, PE, ABS and PC, still lacks the quality of wood on appearance and smell, therefore, has failed to satisfy the aesthetical needs of people in modern society. In addition, the plastic flour with plasticity and the wooden flour that are adopted in this method are present in the percentage of 80-20 and 20-80 respectively, which has further made it hard to achieve even blending between them, and hard to produce the boards or profiles with high standard.

Meanwhile, Chinese patent claim (02129412.7) relates to plastic/wooden boards, with the components including polyvinyl chloride (PVC), wooden flour, mineral filler, lubricant, thermal stabilizer, crosslinker, solubilizer and colorant. Its feature is that the components with the weight percentages are as follows: polyvinyl chloride PVC (45-48 wt. %), wooden flour (38-40 wt. %), mineral filler (titanium dioxide or calcium carbonate, 6-7 wt. %), N'N-Ethylene Bis Stearamide (0.8-1 wt. %) or polyethylene wax (0.3-0.5 wt. %), AC629(ethylene oxide, 0.5-0.8 wt. %) calcium stearic (0.7-0.8 wt. %), (Methyl tin mercaptide) (0.9-1 wt. %), ACR-401 (3-4 wt. %) and suitable amount of colorant. While such a structure, which adopts a combination with multiple components to produce boards, resolves the problem of uneven blending between wooden flour and polyvinyl chloride, the aim of environmental protection is compromised because a large amount of wood is still being used (38-40 wt. %), and the resulting boards still have trouble maintaining the appearance and smell of wood.

SUMMARY

Aiming to resolve the defects of present techniques, the technical disclosure herein provides a new type of composite with wooden quality, which not only maintains the good quality of resin material concerning anti-erosion, whether resistance, mechanism intensity, anti-water and anti-humidity, but also keeps the quality of wood on appearance and smell.

Another aim of this technical disclosure is to provide a preparation method for this new type of composite with wooden quality, while resolving such problems as the poor compatibility between wood flour and resin, and existing poor processing procedures.

The aforementioned problems are resolved through the disclosed new type of composite with wooden quality, which comprises an inner plastic layer and an outer envelope, where the two layers are cross linked to form a whole body, and that the envelope is made up from plastics blended with wooden flour with a weight percentage of wood flour in the outer envelope layer being 5-20 wt. %.

In one embodiment, the composite with wooden quality includes a thickness ratio between the envelope and the inner layer that is 1:3-6 (i.e. in units of m, cm, and mm for example), in which the granularity of the wood flour adopted for envelope is 50-120 meshes.

The new type of composite with wooden quality involved in this disclosure is low in wood flour, with the bi-layer structure, in which the inner layer with plastic material maintains the quality of impact resistance, ageing resistance, anti-erosion, anti-humidity and fire resistance. On the other hand, the envelope is made up from plastics, such as a plastic elastomer, blended with wood flour having a weight percentage of 5-20 wt. %, in which the granularity of the wood flour is between 50-120 meshes.

In the past, there has been difficulty in melting the wood flour and plastic elastomer together, because they are hydrophilic and hydrophobic respectively. In the disclosure herein, however, a lower content of wood flour is applied, with respect to the amount of plastic materials used. Other components such as coupling agents are also added, which help the wood flour and plastic elastomer melt together through a secondary plasticization (i.e. re-plasticization).

In other past composites, achieving satisfactory texture of original wood quality has been difficult, such as when the content of wood flour is too low or the granularity is too large. Further, the cost is too large if the content of wood flour is too high and when the particle is too small, extrusion procedures become difficult. However, in the disclosure herein, because the components of the respective outer envelope and the inner plastic layer include many similarities, they can be more easily cross linked into a single, unitary, and integral body after co-extrusion, and can enjoy tight cross-linking between the outer envelope and the plastic inner layer, without separation. The composite involved in this disclosure not only maintains the good quality of plastic material of high standard of anti-erosion and weather resistance, strong intensity, anti-water, anti-humidity, but also has characteristics resembling real wood in both the appearance and smell with only a little amount of wood flour being used.

In one embodiment, the components with their corresponding weight percentage in the envelope include: plastic elastomer (50-70 wt. %), wood flour (5-20 wt. %), calcium carbonate (10-20 wt. %), organic stannum (0.5-5 wt. %), chlorinated polyethylene (5-10 wt. %) and acrylic polymer (1-5 wt. %). The foresaid plastic inner layer includes components with the weight percentages as follows: plastic elastomer (55-75 wt. %), calcium carbonate (10-20 wt. %), organic stannum (0.5-5 wt. %), polyvinyl chloride (5-15 wt. %) and acrylic polymer (1-5 wt. %).

The plastic materials for the inner layer of the composite involved in this disclosure include but are not limited to a category of high-molecular resins, such as PVC, PP, PE, ABS, PS etc, with strong plasticity to form the basic frame of the composite, while the calcium carbonate may increase the mechanic strength and intensity of the plastic materials, and therefore increase the anti-impact quality of the composite. Furthermore, the calcium carbonate added into the plastic inner layer of the composite may also increase its capacity to be fire resistant. As one example, methyl tin mercaptide may be used in a combined thermal stabilizer (others may also include combine lead, and calcium/zinc combined stabilizer), which may also increase the quality of the composite concerning anti-aging and anti-erosion. Chlorinated polyethylene and acrylic polymer may be used to modulate the molecular structure of the composite, in which polyvinyl chloride increases tensile strength and the mechanic intensity of the composite, and acrylic polymer improves the fluidity of the material. which is helpful during the extrusion process in producing the final product.) of the composite.

In the foresaid new type of composite with wooden quality, the envelope includes materials having weight percentage such as follows: polythene wax (0.2-0.8 wt. %), stearic acid (0.2-0.8 wt. %), calcium stearic (1.0-2.0 wt. %), silane (0.2-0.6 wt. %), titanium dioxide (5-10 wt. %). The foresaid former three materials may be added to the outer envelope and may increase the fluidity during the extrusion of the product, facilitating the synchronized coverage extrusion process with the plastic inner layer in forming a complete body. Because of the inflammable envelope outside the plastic inner layer, silane and calcium carbonate with the weight percentages of 0.2-0.6 wt. % and 10-20 wt. % respectively may be added to the envelope, which will dramatically increase the fire resistance. Titanium dioxide is a kind of light shield agent, which will ameliorate the quality of light penetration of the whole composite if added with a proper amount, decrease the transparency and improve the quality of weather resistance of the whole product.

In the foresaid new type of composite with wooden quality, the plastic inner layer may also include materials having weight percentages such as follows: polythene wax (0.2-0.8 wt. %), stearic acid (0.2-0.8 wt. %), calcium stearic (1.0-2.0 wt. %), silane (0.1-0.4 wt. %), titanium dioxide (5-10 wt. %). Polythene wax (PE wax), stearic acid and calcium stearic are all lubricants that may be added, and which can increase the fluidity during the extrusion of the plastic inner layer, thereby facilitating the synchronized coverage extrusion with the outer envelope to form a whole body of the composite. Furthermore, the foresaid three materials can also improve the surface finish of the composite. Silane not only improves the fluidity of the plastic inner layer's raw materials being extruded, but also dramatically improves the fire resistance of the final product. Titanium dioxide is a kind of light shield agent, which can improve the quality of preventing light penetration of the whole composite if added in a proper amount, and can decrease the transparency.

In the foresaid new type of composite with wooden quality, the foresaid envelope may also include the materials having weight percentages such as follows: antioxidant (0.1-0.4 wt. %), coupling agent (0.1-0.4 wt. %) and ultraviolet absorbant (0.1-0.4 wt. %), the latter of which includes the category of materials such as UV-531, UV-P, UV-326, UV-327, UV-328. As the composite involved within this disclosure is mainly applied to outdoor decoration of buildings, and being kept outdoors for a long time, the foresaid three materials may be added to help significantly improve anti-ultraviolet protection, or help prevent/cease color alteration and degeneration even when the composite is exposed to sunlight during a long time.

For the purpose of color blending, organic or mineral colorants are added into the new type of composite with wooden quality involved in this disclosure and are added as needed according to product specifications.

Furthermore, the following disclosure also provides an embodiment for preparing any of the foresaid new type of composite with wooden quality, which includes steps as follows:

A. Raw material preparation, blending and particle formation: Raw material preparation is carried out according to the materials that are to be contained in the inner layer with their corresponding percentages of weight. The materials are put into a mixer for high-speed blending for 10-15 minutes. When the temperature of the materials rises to 120° C., the blended materials are discharged and cooled, and then kept in a bag for later usage. Then raw material preparation is carried out according to the materials that are to be contained in the outer envelope with the corresponding percentages of weight. The wood flour is dried under the temperature of 80-120° C. and until the water content decreases to a level lower than 5 wt. %. After being dried, the wood flour is put into the mixer together with the other materials for the outer envelope for high-speed blending for 10-15 minutes. The blended material is discharged and cooled after the temperature rises to 120° C., and then particle formation is carried out by extrusion, which is called the primary plasticization coupling between wood flour and plastics to form particles.

B. Synchronized coverage extrusion: the material of inner layer of the composite, which have been blended, is added into a principal extruder. Then the materials contained in the envelope of the composite, which has undergone particle production (primary plasticization coupling), is added into an additional extruder (which is called the secondary plasticization coupling between wood flour and plastics). Then the synchronized coverage extrusion is carried out with the foresaid two extruders to cross link the envelope and the inner layer into a single, unitary, and integrally formed body as the semi-final product of the composite.

C. Cooling down and finalization: the semi-final product of the composite is cooled down, such as on a cooling/finalization table (e.g. finalization box), by being towed or drawn with a drawing machine to accomplish the procedure of cooling down/finalization.

D. Cutting/Quality simulation polishing: the foresaid semi-final products of the composite is cut to specifications and then put into a polisher to carry out quality simulation. Quality simulation means the determining the degree of how similar the composite is with real wood, and a polishing procedure is performed to obtain the simulated new type of composite with wood quality as well as the smell of the original wood.

The wood flour being dried in this invention under 80~120° C. until the water content is below 5 wt. %, can effectively prevent carbonization. Then the wood flour is blended with a high-speed mixer and is then cooled down. The primary plasticization of the outer envelope is carried out through melting the wood flour with the other materials for the envelope layer together in a principal extruder to produce particles, while co-extrusion is the secondary plasticization (i.e. re-plasticization), through which after with the primary extrusion. That is, the primary and secondary plasticization separate steps in preparing the material for the outer envelope layer, where particle formation is the primary plasticization and co-extrusion is the secondary plasticization. The outer envelope layer and the plastic inner layer are then melted tightly (i.e. cross-linked) during the synchronized coverage extrusion process, so as to form the integral, one-piece composition that does not separate.

In the foresaid preparation method for the new type of composite with wooden quality, the raw materials in each layer involved in step A are cooled after 10-15 minutes of blending of the components, and then discharged when the temperature decreases to 30° C.~50° C. It will be appreciated that when the blending materials' temperature rises to 120° C., these materials in each respective layer will be evenly blended by and large.

In the foresaid preparation method for the new type of composite with wooden quality, the temperature of each part extruded from the principal extruder in procedure B should be controlled between 150° C.~190° C., with that of an extruding outlet being controlled between 160° C.~185° C., and a spin speed of the screw of the principal extruder between 10-50 rev/min. The reason to control the temperature of each part extruded from the principal extruder and the extrusion outlet is to control the fluidity of various components in the plastic inner layer, in order to fully plasticize the PVC, to keep the quality of the product and increase the processing quality. The reason to control the spin speed of screw of the principal extruder between 10-50 rev/min is to keep the components of the plastic inner layer in accordance (together) with that of outer envelope, in order to facilitate the synchronized coverage extrusion.

In the foresaid preparation method for the new type of composite with wooden quality, the temperature of each part extruded from the additional extruder in procedure B should be controlled between 110° C.~170° C., with that of an extruding outlet being controlled between 140° C.~170° C., and a spin speed of the screw of the additional extruder between 10-30 rev/min. The reason to control the temperature of each part extruded from the additional extruder and that of the extrusion outlet between 110° C.~170° C. is to keep the fluidity of various components in the envelope, in order to fully plasticize the PVC, to melt it with wood flour in high standard to keep the products' quality, and to improve the processing standard. The reason to control the spin speed of the screw of the additional extruder between 10-30 rev/min is to keep the components of the envelope in accordance with that of the plastic inner player, thereby facilitating the synchronized coverage extrusion.

Moreover, this disclosure also provides a kind of profile fabricated with the foresaid new type of composite with wooden quality, with the envelope layer covering upon the plastic inner layer symmetrically, asymmetrically or wholly, such as in a square column, board and/or crosspiece that may be adopted in outer bars or exposed parts of a building.

This disclosure also provides another kind of profile fabricated with the foresaid new type of composite with wooden quality, with the envelope layer partly covering upon the plastic inner layer, such as in composites used for floors and windows. In short, the composite with its preparation involved in this disclosure can provided the following benefits:

1. The new type of composite with wooden quality involved in this disclosure includes characteristics that completely resemble original wood with the original smell, and which can be adopted as decoration material indoors or outdoors and with excellent quality.
2. The components of the plastic inner layer and the envelope of the new type of composite with wooden quality involved in this disclosure are environmentally safe, and pose less of a risk of polluting the environment. They can be used repeatedly and are recyclable. The wooden flour used comes from waste material such as that produced during wood processing (i.e. sawing powder of the wood) which undergoes further processing, and which may be the recycling of such waste, so as to protect forest resources and the natural environment.
3. The preparation of the new type of composite with wooden quality involved in this disclosure employs a synchronized coverage extrusion procedure with wood flour and high molecular components, with the high standard of melting between wood flour and molecular components, and whole-body formation in tightness of the envelope and the plastic inner layer, without separation.
4. Extrusion is adopted for the preparation of the new type of composite with wooden quality involved in this disclosure, and results in a hollow product with wooden quality, great extrusion capacity and high yield, which not only economizes energy, but also gains high economic profits and social benefit.
5. The preparation of the new type of composite with wooden quality involved in this disclosure not only can resolve the problems existing in present technology such as poor compatibility between wood flour and high molecular materials and poor processing quality and high density of the products, but can also overcome the shortcoming of original wood such as poor capacity of anti-erosion, anti-water and fire resistance, keeping the intrinsic feature, texture and smell of the original wood.
6. The technology involved in the preparation of the new type of composite with wooden quality involved in this disclosure is simple with low cost. The fabricated new type of composite with wooden quality are of excellent physical and mechanics features, with each index arriving at or surpassing the standard of GB/T8814-2004.

DETAILED DESCRIPTION

Figure 1:
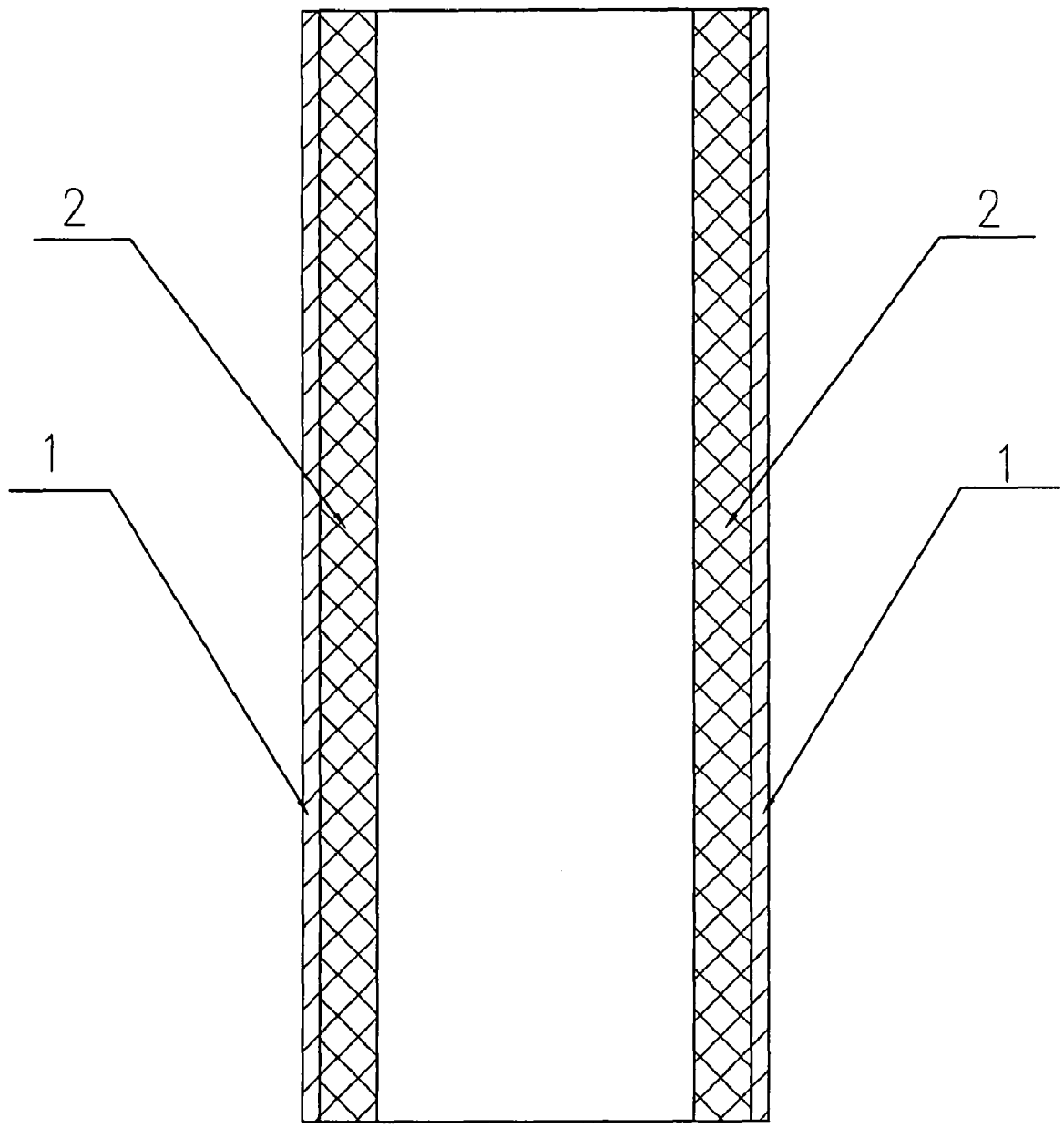
FIG. 1 is the sketch of a section profile of one embodiment of a composite with wooden quality. In which, 1 represents the envelope and 2 represents the plastic inner layer.

The following are examples involved in this technical disclosure, which can be regarded as the further explanation and illustration the inventive concepts, but the inventive concepts and embodiments disclosed herein are not limited within these examples.

Example 1

The Fabrication Process of the New Type of Composite with Wooden Quality (Boards):
A. Raw material preparation, blending and particle formation: The raw material preparation for the plastic inner layer is carried out to include components with their weight percentages as prescribed in table 1. The components with the weight percentages described are added into a mixer (Jieda, Zhangjiagang, SRL-Z 500/1000) for blending for about 10 minutes. When the blending temperature rises to 120° C., the raw material is put into a cooling pot (the matched equipment for Jieda blending group, Zhangjiagang, SRL-Z 500/1000) to be cooled until the temperature of the raw material decreases to 30° C., when the material is discharged. The raw material preparation for the outer envelope is carried out to include components with their weight percentages as described in table 1. The wood flour is dried under 80° C. and until the water content decreases to 5 wt. %. After being dried, the wood flour and the other materials for the envelope are put into the mixer (Jieda, Zhangjiagang, SRL-Z 500/1000) for blending for about 10 minutes. The raw materials are then put into a cooling pot when the temperature rises to 120° C. (the matched equipment for Jieda blending group, Zhangjiagang, SRL-Z 500/1000) and are to be cooled until the temperature of the raw material decreases to 30° C., when the material is discharged. The foresaid plastic envelope material, which has undergone blending, are added into a principal extruder to produce particles (Shanghai, Jinwei type 65) and to carry out particle formation, with the temperature of each part extruded by the principal extruder being controlled between 110-165° C., and that of an interflow joint at 165° C., and where a spin speed of a screw of the principal extruder being controlled as 20 rev/min, to achieve primary plasticization of the envelope materials.

B. Synchronized coverage extrusion: The components of the foresaid plastic inner player that has undergone blending are added into a principal extruder (Shanghai Jinwei Type 65), with the temperature of each part of the principal extruder being controlled between 160-185° C., and that of the interflow joint at 185° C., and the spin speed of screw of the principal extruder being controlled as 20 rev/min. The components of the plastic inner layer are extruded from moulds already designed according to required board dimensions. Meanwhile, the components of the envelope, which have undergone the blending and particle formation, are put into an additional extruder (Shanghai Jinwei JWM-50), with the temperature of each part extruded by the additional extruder being controlled between 110-155° C., and that of the interflow joint at 160° C., and the spin speed of the screw of the additional extruder at 20 rev/min. Through the additional extruder, components contained in the envelope are converged into that contained in the foresaid plastic inner layer in the flow channel of the mould, so as to achieve the synchronized coverage extrusion and produce a semi-final composite product, in which the thickness ratio between the foresaid plastic inner layer and the envelope is 4:1.

C. Cooling and finalization: the foresaid semi-final composite products, which has undergone the synchronized coverage extrusion, is finalized by being towed or drawn into a finalizing mould, fabricated according to required specifications for the boards, with a drawing machine (The equipment matched to Shanghai Jinwei Type 65), and cooled with circulating water under a temperature that is below 25° C., and in which the same speed of the synchronized coverage extrusion may be used for the drawing machine.

D. Cutting and quality simulation polishing: the foresaid semi-final composite product that has undergone cooling and finalization is cut according to the board specifications required, with a deviation in the cutting length being controlled to be no larger than ±1% of expected specifications. Then a polisher (Hangzhou Xiangsheng 400) is adjusted according to the polishing characteristics required for the boards. The new type of composite with wooden quality (boards) is obtained after polishing.

As illustrated in FIG. 1, the new type of composite with wooden quality (boards) involved in this disclosure contains the plastic inner layer 1 and the outer envelope 2, in which the two are crosslinked to form a one-piece integral body, with the foresaid outer envelope layer covering upon the plastic inner layer.

The feature index of the new type of composite with the wooden quality fabricated according to the preparation method foresaid and the components listed in table 1 are illustrated in table 4 (refer to GB/T8814-2004 concerning some of the data).

TABLE 1

Components of new type of composite (board) with wooden quality in implement of example 1 together with their weight percentages.

| component | Example 1 | |
|---|---|---|
| | Plastic inner layer | envelope |
| Pure wood flour | 0 | 6.5 |
| Plastic elastomer | 61.9 | 58.2 |
| calcium carbonate | 17.5 | 10 |
| chlorinated polyethylene | 6.5 | 5.5 |
| ACR | 3.5 | 3.0 |
| Organic stannum | 1.3 | 1.3 |
| PE wax | 0.65 | 0.65 |
| Stearic acid | 0.65 | 0.65 |
| Calcium stearic | 1.3 | 1.1 |
| Silane | 0.2 | 0.4 |
| Titanum dioxide | 5.5 | 8.5 |
| Ultraviolet absorbant | 0 | 0.2 |
| Antioxidant | 0 | 0.2 |
| Coupling agent | 0 | 0.2 |
| Palettes | Proper amount (Any suitable amount may be used to achieve proper color) | Proper amount (Any suitable amount may be used to achieve proper color) |

In which, the foresaid plastic elastomer is PVC, with the stated ultraviolet absorbant as UV-531, the stated antioxidant as 1010, the stated coupling agent as OL-1, the stated organic stannum as stannum methyltin mercaptide, and the stated pure wood flour with the particles of 50-120 meshes.

Example 2

The Fabrication Process for the New Type of Composite with Wood Quality (Crosspiece):

A. Raw material preparation, blending and particle formation: The raw material preparation for the plastic inner layer is carried out to include components with their weight percentages as prescribed in table 2. The components with their weight percentages are added into a mixer (Zhangjiagang Jieda SRL-Z 500/1000) to be blended for about 10 minutes. The raw materials are put into a cooling pot (the matched equipment of Zhangjiagang Jieda SRL-Z 500/1000 mixer) to be cooled down when the temperature rises to 120° C. Then the raw materials are discharged when the temperature decreases to 30° C. Raw material preparation for the envelope is carried out to include components with their weight percentages as prescribed in table 2. The wood flour is dried under 95° C. and until the water content is below 5 wt. %. The wood flour and other components of the envelope are added to the mixer (Zhangjiagang SRL-Z 500-1000) for material blending for about 10 minutes. The raw materials are put into a cooling pot (the matched equipment of Zhangjiagang Jieda SRL-Z 500/1000 mixer) to be cooled down to 35° C., then the raw materials are discharged. The components of the plastic envelope, which have been blended, are put into the principle extruder for particle production (Shanghai Jinwei Type 65) to produce the particles, with the temperature of each part extruded by the principal extruder being controlled between 110-165° C., that of the interflow joint being at 165° C., and the spin speed of the screw of the principal extruder being 20 rev/min, to achieve the primary plasticization of the envelope.

B. Synchronized coverage extrusion: The components of the plastic inner layer that have been blended are put into the principal extruder (Shanghai Jinwei Type 65), with the temperature of each part extruded by the principal extruder being controlled between 150-185° C., and that of the interflow joint being 180° C., and the spin speed of the principal extruder being 40 rev/min. The components of the plastic inner layer are extruded by a mould, which is designed in advance according to dimension specifications for the crosspiece. Meanwhile, the components of the envelope that have undergone blending and particle formation are added into the additional extruder (Shanghai Jinwei JWM-50), with the temperature of each part extruded by the additional extruder being controlled between 115-145° C., and that of the interflow joint at 155° C. and the spin speed of the screw of the additional extruder being 25 rev/min. Through the additional extruder, components contained in the envelope are converged into that contained in the foresaid plastic inner layer in the flow channel of the mould, so as to achieve the synchronized coverage extrusion and produce a semi-final product, in which the thickness ratio between the foresaid plastic inner layer and the envelope is 3:1.

C. Cooling and finalization: The foresaid semi-final composite products, which has undergone the synchronized coverage extrusion, is finalized by being towed or drawn into a finalizing mould, fabricated according to required specifications for the crosspiece, with a drawing machine (The equipment matched to Shanghai Jinwei Type 65), and cooled with circulating water under temperature below 25° C., in which the speed of the drawing machine should be the same as that of the synchronized coverage extrusion.

D. Cutting and quality simulation polishing: The foresaid semi-final composite product that has undergone cooling and finalization is cut according to specification requirements of the crosspiece, with a deviation in the cutting length being controlled to be no larger than ±1% of expected specifications. The polisher (Hangzhou Xiangsheng 400) is adjusted according to the required polishing characteristics of the crosspiece. The new type of composite with wooden quality (crosspiece) is obtained after polishing.

The new type of composite with wooden quality (crosspiece) involved in this disclosure contains the plastic inner layer and the outer envelope, in which the latter two are cross-linked into a single integral body, with the foresaid envelope covering upon the plastic inner layer completely.

The feature index of the new type of composite (crosspiece) with wood quality fabricated according to the foresaid preparation and the materials listed in table 2 is listed in table 4 (refer to GB/T8814-2004 standard for some of the data).

TABLE 2

The components of the new type of the composite with wood quality (crosspiece) in example 2 with their weight percentages

| Component | Example 2 | |
|---|---|---|
| | Plastic inner layer | Envelope |
| Pure wood flour | 0 | 10 |
| Plastic elastomer | 75 | 69.2 |
| calcium carbonate | 18 | 10 |
| chlorinated polyethylene | 5 | 5 |
| ACR | 1.8 | 1.8 |
| Organic stannum | 1.5 | 1.5 |
| PE wax | 0.8 | 0.8 |
| Stearic acid | 0.5 | 0.2 |
| Calcium stearic | 2.0 | 0.8 |
| Silane | 0.4 | 0.6 |
| Titanum dioxide | 5 | 8 |
| Ultraviolet absorbant | 0 | 0.4 |
| Antioxidant | 0 | 0.4 |
| Coupling agent | 0 | 0.4 |
| Palettes | Proper amount (Any suitable amount may be used to achieve proper color) | Proper amount (Any suitable amount may be used to achieve proper color) |

In which, the foresaid plastic elastomer is PVC with the stated ultraviolet absorbant as UV-531, the stated antioxidant as 1010, the stated coupling agent as OL-1, the stated organic stannum as stannum methyltin mercaptide, and the stated pure wood flour with the particles of 50-120 meshes.

Example 3

The Fabrication Procedure of the New Type of Composite with Wood Quality (Square Column):

A. Raw material preparation, blending and particle formation: raw material preparation of the plastic inner layer is carried out to include the components with their weight percentages as described in table 3. The raw materials are added into the mixer (Zhangjiagang Jieda SRL-Z 500/1000) to be blended for about 10 minutes. The raw materials are put into the cooling pot (the matched equipment of Zhangjiagang Jieda SRL-Z 500/1000 mixer) to be cooled down when the temperature rises to 120° C. The raw materials are discharged when the temperature decreases to 30° C. Raw material preparation of the outer envelope is carried out to include the components with their weight percentages as described in table 3. The wood flour is dried under 95° C. and until the water content is below 5 wt. %. The wood flour and other components are added to the mixer (Zhangjiagang SRL-Z 500-1000) for material blending for about 10 minutes. The raw materials are put into the cooling pot (the matched equipment of Zhangjiagang Jieda SRL-Z 500/1000 mixer) to be cooled down to 40° C., then the raw materials are discharged. The components of the plastic envelope, which have been blended, are put into the principal extruder for particle formation (Shanghai Jinwei Type 65) to produce the particles, with the temperature of each part extruded by the principal extruder being controlled between 110-165° C., and that of the interflow joint being at 165° C., and the spin speed of the screw of the principal extruder being 20 rev/min, to achieve the primary plasticization of the envelope.

B. Synchronized coverage extrusion: The components of the plastic inner layer that have been blended are put into the principal extruder (Shanghai Jinwei Type 65), with the temperature of each part extruded by the principal extruder being controlled between 160-185° C., and that of the interflow joint at 188° C., and the spin speed of the principal extruder as 40 rev/min. The components of the plastic inner layer are extruded by the mould, which is designed in advance according to dimension specifications for the square column. Meanwhile, the components of the envelope that have undergone blending and particle formation are added into the additional extruder (Shanghai Jinwei JWM-50), with the temperature of each part extruded by the additional extruder being controlled between 120-145° C., and that of the interflow joint at 155° C. and the spin speed of the screw of the additional extruder being 30 rev/min. Through the additional extruder, the components contained in the envelope are converged into that contained in the foresaid plastic inner layer in the flow channel of the mould, so as to achieve the synchronized coverage extrusion and produce a semi-final product, in which the thickness ratio between the foresaid plastic inner layer and the envelope is 5:1.

C. Cooling and finalization: The foresaid semi-final composite products, which has undergone the synchronized coverage extrusion, is finalized by being towed or drawn into a finalizing mould, fabricated according to dimension specification requirements of the square column, with the drawing machine (The equipment matched to Shanghai Jinwei Type 65), and cooled with circulating water under temperature below 25° C., in which the speed of the drawing machine should be the same as that of the synchronized coverage extrusion.

D. Cutting and quality simulation polishing: The foresaid semi-final composite product that has undergone cooling and finalization is cut according to specification requirements of the square column, with a deviation in the cutting length being controlled to be no larger than ±1% of expected specifications. The polisher (Hangzhou Xiangsheng 400) is adjusted according to the polishing characteristics required for the square column. The new type of composite with wooden quality (crosspiece) is obtained after polishing.

The new type of composite with wooden quality (crosspiece) involved in this disclosure contains the plastic inner layer and the outer envelope, in which the latter two are crosslinked into a whole body, with the foresaid envelope covering upon the plastic inner layer completely.

The feature index of the new type of composite (crosspiece) with wood quality fabricated according to the foresaid preparation and the materials listed in table 3 is listed in table 4 (refer to GB/T8814-2004 standard for some of the data).

TABLE 3

The components of the new type of the composite with wood quality (square column) in example 3 with their weight percentages

| | Example 3 | |
| --- | --- | --- |
| Component | Plastic inner layer | Envelope |
| Pure wood flour | 0 | 10 |
| Plastic elastomer | 57.8 | 50.3 |
| calcium carbonate | 20 | 10 |
| chlorinated polyethylene | 12 | 6.0 |
| ACR | 1.0 | 1.5 |
| Organic stannum | 2.0 | 3.0 |
| PE wax | 0.8 | 0.6 |
| Stearic acid | 0.2 | 0.5 |
| Calcium stearic | 1.0 | 2.0 |
| Silane | 0.4 | 0.6 |
| Titanium dioxide | 5.0 | 9.0 |
| Ultraviolet absorbant | 0 | 0.22 |
| Antioxidant | 0 | 0.22 |
| Coupling agent | 0 | 0.22 |
| Palettes | Proper amount (Any suitable amount may be used to achieve proper color) | Proper amount (Any suitable amount may be used to achieve proper color) |

In which for example, the foresaid plastic elastomer is PVC, with the stated ultraviolet absorbant as UV-531, the stated antioxidant as 1010, the stated coupling agent as OL-1, the stated organic stannum as stannum methyltin mercaptide, and the stated pure wood flour with the particles of 50-120 meshes.

TABLE 4 index of physical and chemical features of example 1-3

| | Example | | |
| --- | --- | --- | --- |
| Feature index | 1 (board) | 2 (crosspiece) | 3 (square column) |
| Longitudinal reversion | 3.1 parts | 3.5 parts | 4.3 parts |
| Tensile strength | 38 MPa | 39 MPa | 40 MPa |
| Drop weight test (−10° C., 1 Kg, 1.5 m) | No dilapidation | No dilapidation | No dilapidation |
| Density | 1458 kg/M3 | 1453 kg/M3 | 1448 kg/M3 |
| Color alteration after aging | No obvious alteration after 5000 hours ($\Delta E \leq 5$) | No obvious alteration after 5000 hours ($\Delta E \leq 5$) | No obvious alteration after 5000 hours ($\Delta E \leq 5$) |
| Vicat softening point | 79° C. | 81° C. | 80° C. |
| Appearance | Exactly the same as the appearance of original wood | Exactly the same as the appearance of original wood | Exactly the same as the appearance of original wood |
| Smell | Exactly the same as the smell of original wood wood | Exactly the same as the smell of original wood | Exactly the same as the smell of original wood |

It can be inferred from table 4 that the new type of the composite involved in the disclosure herein not only maintains the excellent features of resin concerning anti-erosion, weather resistance, mechanic strength, anti-water and anti-humidity, but also retains the appearance and smell of the original wood.

The examples and details described here are only illustrations of the essence of the inventive concepts. Technicians or engineers may carry out modifications or supplements on the examples, or replace them with similar methods without deviating from the inventive concepts herein.

Despite the detailed explanations in some of the actual examples and that further alteration or correction may be made by experienced technicians or engineers without deviation, the scope of the invention shall reside in the claims herein.

The invention claimed is:

1. A method of producing a composition with wooden quality comprising:
    (A) preparing raw materials for an inner layer according to weight percentages of materials to be included in the inner layer;
    putting the materials into a blender and blending for 10-15 minutes;
    cooling the blended materials and storing the materials for later usage;
    preparing raw materials for an outer envelope according to weight percentages of materials to be included in the outer envelope, including drying wood flour under a temperature of 80-120° C. until a water content of the wood flour decreases to a level lower that 5 wt. %;
    preparing raw materials for the outer envelope also includes putting the wood flour into a blender and blending the wood flour and other raw materials for the outer envelope for 10-15 minutes;
    cooling the blended materials, extruding the materials to produce particles, so as to couple the wood flour and the other raw materials for the outer envelope;
    (B) adding the raw materials of the inner layer into a principal extruder;
    adding the materials of the outer envelope into an additional extruder;
    carrying out synchronized extrusion with the two extruders so as to cross link the outer envelope and the inner layer into a single, unitary, and integral body, the single, unitary, and integral body being a semi-final product;
    (C) cooling down the semi-final product by towing the semi-final product with a drawing machine; and
    (D) cutting the semi-final product and polishing the semi-final product so as to obtain the composition having wood-like characteristics in appearance and smell.

2. The method of claim 1 wherein (A) further includes cooling down the materials of the outer envelope after being blended for 10-15 minutes;
    and taking the materials out of the blender when the temperature decreases to 30-50° C., extruding the materials to produce particles that are stored for later usage.

3. The method of claim 1 wherein the temperature of each part extruded from the principal extruder stated in (B) being controlled between 150° C.~190° C., and with that of an extruding outlet being controlled between 160° C.~185° C., and a spin speed of a screw of the principal extruder is between 10-50 rev/min.

4. The method of claim 1 wherein the temperature of each part extruded from the principal stated in (B) being controlled between 110° C.~170° C., and with that of an extruding outlet being controlled between 140° C.~170° C., and a spin speed of a screw of the principal extruder is between 10-30 rev/min.

5. The method of claim 1 wherein polishing the semi-final product includes polishing the semi-final product to carry out a quality simulation to determine a degree of similarity of the composition compared to real wood such that the composition has wood-like characteristics in appearance and smell.

* * * * *